United States Patent
Padios et al.

(10) Patent No.: US 9,835,223 B2
(45) Date of Patent: Dec. 5, 2017

(54) BEARING

(71) Applicant: Carl Freudenberg KG, Weinheim (DE)

(72) Inventors: Alexander Padios, Berlin (DE); Heiko Kannegiesser, Oranienburg (DE); Detlef Cordts, Wandlitz (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 15/032,058

(22) PCT Filed: Aug. 22, 2014

(86) PCT No.: PCT/EP2014/002308
§ 371 (c)(1),
(2) Date: Apr. 26, 2016

(87) PCT Pub. No.: WO2015/062680
PCT Pub. Date: May 7, 2015

(65) Prior Publication Data
US 2016/0265620 A1    Sep. 15, 2016

(30) Foreign Application Priority Data
Oct. 30, 2013  (DE) .................... 10 2013 018 185

(51) Int. Cl.
| F04B 39/00 | (2006.01) |
| F16F 15/08 | (2006.01) |
| F16F 3/087 | (2006.01) |
| B63H 21/30 | (2006.01) |
| F16M 13/02 | (2006.01) |

(52) U.S. Cl.
CPC ........... *F16F 15/08* (2013.01); *B63H 21/305* (2013.01); *F16F 3/0876* (2013.01); *F16M 13/02* (2013.01)

(58) Field of Classification Search
CPC ............................. F16M 13/02; F16F 3/0875
See application file for complete search history.

(56) References Cited

U.S. PATENT DOCUMENTS

| 2,705,118 | A | * | 3/1955 | Beck ........................ | F16F 13/08 |
| | | | | | 105/131 |
| 3,749,340 | A | | 7/1973 | Williams et al. | |
| 4,671,532 | A | | 6/1987 | Matschinsky et al. | |
| 5,277,554 | A | * | 1/1994 | Elson ........................ | F04B 39/00 |
| | | | | | 248/638 |
| 6,067,700 | A | | 5/2000 | Tang et al. | |
| 7,798,464 | B2 | * | 9/2010 | Brewer, III ............. | F16F 1/373 |
| | | | | | 248/560 |
| 2007/0175356 | A1 | | 8/2007 | Gedenk et al. | |
| 2008/0229968 | A1 | | 9/2008 | Gedenk et al. | |

FOREIGN PATENT DOCUMENTS

| CN | 1942355 A | 4/2007 |
| DE | 102007024326 A1 | 11/2008 |
| EP | 0193090 A2 | 9/1986 |
| EP | 0860833 A2 | 8/1998 |
| JP | 11166570 A | 6/1999 |
| JP | 2007530330 A | 11/2007 |
| JP | 2012197822 A | 10/2012 |

* cited by examiner

*Primary Examiner* — Amy Jo Sterling
(74) *Attorney, Agent, or Firm* — Lleydig, Voit & Mayer, Ltd.

(57) ABSTRACT

A bearing having at least two rubber bushings, each having a vertical axis of rotation, the rubber bushings being functionally connected in parallel.

20 Claims, 4 Drawing Sheets

BEARING

CROSS-REFERENCE TO RELATED APPLICATIONS

This application is a U.S. national stage application under 35 U.S.C. §371 of International Application No. PCT/EP2014/002308, filed on Aug. 22, 2014, and claims benefit to German Patent Application No. DE 10 2013 018 185.2, filed on Oct. 30, 2013. The International Application was published in German on May 7, 2015, as WO 2015/062680 A1 under PCT Article 21(2).

FIELD

The invention relates to a bearing.

BACKGROUND

Bearings are generally known and are used, for example, in applications for supporting machines.

Heavy machines, such as large diesel marine engines or generators in wind turbines are supported, for example, on individual conical mounts at each bearing position. While on the one hand, conical mounts have the advantage that they can accommodate heavy loads, on the other hand they have the disadvantage that they require a large amount of installation space because the ratio of the length of such a bearing to its greatest width is roughly one. In some applications, such wide bearings cannot be installed due to tight installation space requirements.

SUMMARY

An aspect of the invention provides a bearing, comprising: a first rubber bushing; and a second rubber bushing, wherein each rubber bushing includes a vertical axis of rotation, and wherein the rubber bushings are functionally connected in parallel.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
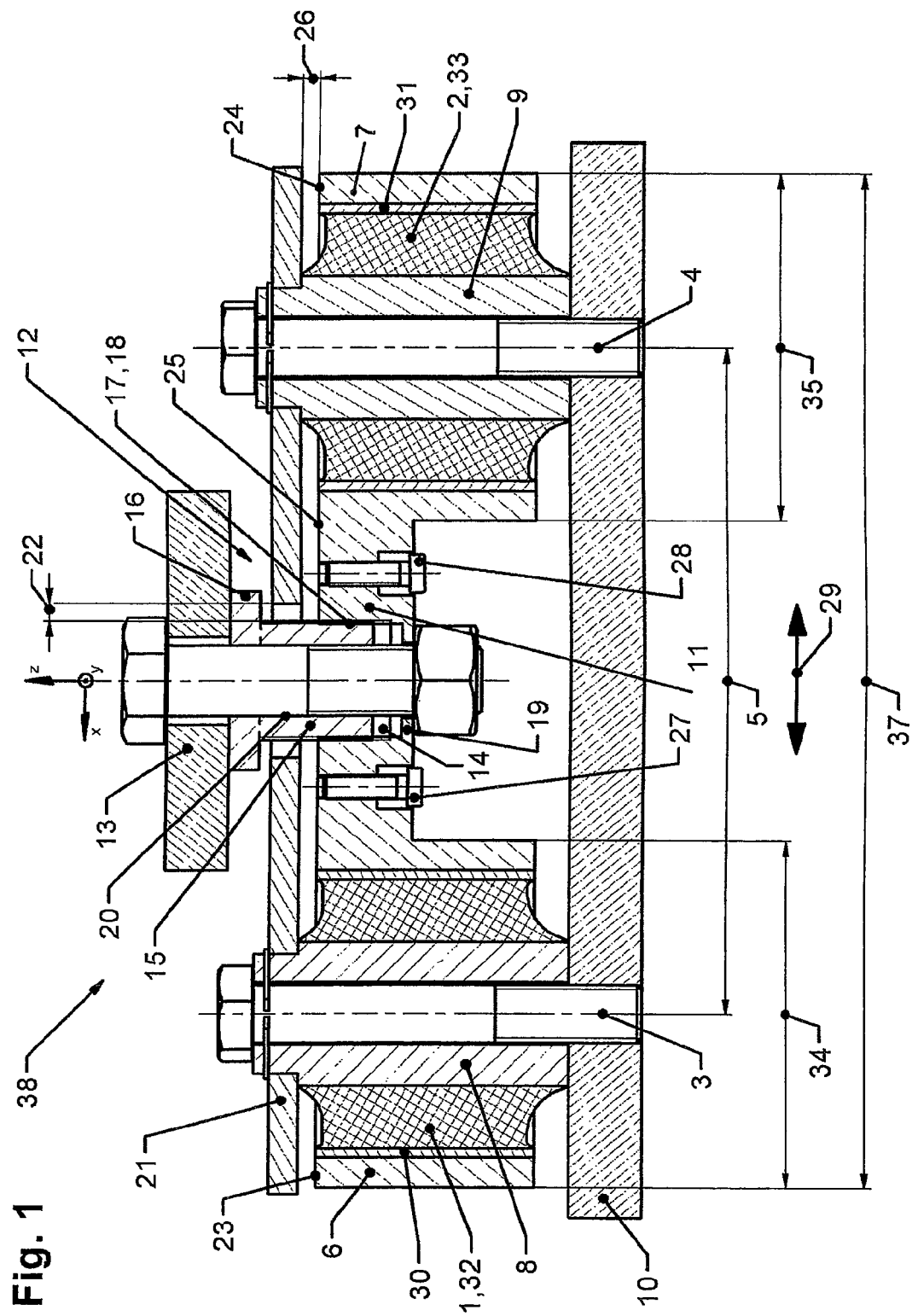
FIG. 1 is a longitudinal sectional view of a first embodiment of the bearing according to the invention.

An aspect of the invention develops a bearing such that it is also suitable for bearing heavy loads when the installation space, viewed in the transverse direction of the bearing, is tight.

To achieve the object, a bearing is provided comprising at least two rubber bushings each having a vertical axis of rotation, said rubber bushings being functionally connected in parallel.

It is advantageous here for the load of the assembly that is to be supported to be distributed across the two rubber bushings, each of the rubber bushings therefore having more compact dimensions than a single conical mount or a bearing which only comprises one rubber bushing in total, and that the two rubber bushings which jointly bear the load of the assembly that is to be supported can be positioned relative to one another such that they can also be installed—viewed in the transverse direction of the bearing—in narrow installation spaces.

The two rubber bushings form a unit that can be pre-assembled. The installation of the bearing comprising the two rubber bushings is simplified as a result and the risk of installation errors is limited to a minimum.

According to one advantageous embodiment, it can be provided for the rubber bushings to be arranged adjacently and at a distance from one another and in each case in a bushing carrier, for the rubber bushings to have in each case a substantially hollow-cylindrical-shaped bushing core which can be connected to a bracket, for the bushing carriers to be interconnected by a bridge, and for the bridge to have an attachment device for attaching an assembly that is to be supported. As a result of the arrangement of the rubber bushings in the bushing carriers and their connection by means of the bridge, and owing to the resultant unit that can be preassembled, the bearing according to the invention is easy to handle. The unit as a whole can be assembled or disassembled as required. Moreover, it is advantageous that the two rubber bushings that are to be used can, for example, be catalogue components or standardized components, as a result of which the bearing can be quickly and cost effectively adapted to the respective conditions of the specific application.

The distance between the rubber bushings extends in the longitudinal direction of the bearing, this distance being spanned by the bridge which connects the two bushing carriers.

The bracket to which the bushing cores can be connected may, for example, be a component of a ship's hull or of a housing of a wind turbine.

The bearing can, for example, support large diesel marine engines or generators, the bracket being vibration-decoupled with respect to the assembly that is to be supported by means of the bearing.

The at least two rubber bushings are preferably rotationally symmetrical in each case and have, for example, a cylindrical, conical or spherical rubber track. As a result of such a configuration, it becomes possible to set the lowest natural frequencies. A progressive characteristic in the longitudinal and transverse direction of the bearing protects the bearing and the assembly that is to be supported from damage by peak loads and/or crashes.

The attachment device can comprise an opening in the bridge, a threaded sleeve being arranged in the opening, the threaded sleeve having at the front end on one side an annular collar for the assembly that is to be supported and, at the front end on the other side, being height-adjustably connected by means of an external thread to a first internal thread of the wall that delimits the opening, and the threaded sleeve having a second internal thread for attaching the assembly that is to be supported on the brace.

The attachment device, viewed in the longitudinal direction of the bearing, is preferably arranged centrally between the vertical axes of rotation of the rubber bushings. As a result, the rubber bushings of the bearing are evenly loaded during the intended use. As a result of this, the bearing has consistently good performance characteristics during a long service life.

The assembly that is to be supported is supported on the annular collar. The magnitude of the surface pressure of the contact surfaces of the collar and the assembly that is to be supported can be influenced by the size of the collar.

The rubber bushings and/or the bushing carriers can be constructed as carry-over parts. The bearing can thus be produced simply and cost-effectively and the assembly of the bearing is simplified thereby.

The threaded sleeve is height-adjustable relative to the bridge. As a result of such a height adjustment of the threaded sleeve relative to the bridge, the bearing can be adapted to the respective installation situation in a simple manner. For example, production-related tolerances of the assembly that is to be supported can also be compensated for as a result of the height-adjustable threaded sleeve. Adjusting the height of the threaded sleeve means that the bearing can be connected without play to the assembly that is to be supported.

The assembly that is to be supported on the bearing by means of the attachment device can, for example, be attached by a screw connection. As soon as the assembly that is to be supported is resting on the collar, it can be screwed using the second internal thread of the threaded sleeve, the external thread of the threaded sleeve being screwed into a first internal thread of the bridge.

On the side of the bushing carriers and of the bridge facing the collar, the bushing cores of the rubber bushings can be connected to a stop plate so as to be immobile, the stop plate peripherally surrounding the threaded sleeve at a radial distance and being associated with the adjacent surfaces of the bushing carriers and of the bridge adjacently and at a vertical distance during intended use of the bearing. Owing to the stop plate, the bearing has stops in all spatial directions in order to limit undesired large, extreme deflection movements.

Removal protection, which forms a vertical travel limiter at the top, is achieved in that the bushing carrier and the bridge can be positioned against the stop plate after travelling the vertical distance.

Deflection protection is formed by a vertical travel limiter at the bottom. Extreme deflection movements of the assembly that is to be supported relative to the bracket can be limited in that the side of the collar facing axially away from the assembly that is to be supported is positioned against the stop plate.

Travel of the assembly that is to be supported relative to the bracket in the horizontal direction is limited in that the threaded sleeve is positioned against the stop plate after travelling the radial distance.

At least one tension screw can be arranged in the bridge for mutually pretensioning the bridge and bushing carrier with respect to the stop plate. More preferably, two screws are arranged opposite one another in the longitudinal direction of the bearing on either side of the opening. The advantage of the mutual pretensioning of the bridge and bushing carrier with respect to the stop plate is that the bearing can already be pretensioned before delivery. For this purpose, the bearing is loaded/deflected and the tension screws are screwed against the stop plate. The deflection can thus be retained during delivery. One advantage to be emphasized is that as a result, a simple installation of the bearing can take place without the assembly that is to be supported having to be raised. After installation of the bearing underneath the assembly that is to be supported, the tension screws are loosened and the pretensioning between the bridge and bushing carriers with respect to the stop plate is reduced, and therefore the collar is positioned against the assembly that is to be supported and can subsequently be screwed thereto.

The use of two tension screws in the longitudinal direction of the bearing on either side of the opening, therefore opposite one another, is advantageous because as a result, undesired tilting of the bushing carrier and bridge relative to the stop plate is ruled out.

The bushing carriers and the bridge are preferably formed in one piece in a manner transitioning into one another and of the same material. It is advantageous here that simple handling of the bearing results from this; the bearing has a simple structure having few parts and as a result, can be produced simply and cost effectively.

The rubber bushings can have in each case an outer sleeve on their outer circumference, the outer sleeves being arranged in a force-fitting manner in the respective bushing carriers. In the case described above, the rubber bushings comprise in each case the bushing core and the outer sleeve, which surrounds the bushing core at a radial distance on the outer circumference thereof, the bellows of the rubber bushing being arranged in the gap formed by the distance. The bellows can be connected to the bushing core and/or the outer sleeve by means of vulcanization.

The rubber bushings are therefore preferably constructed as rubber-metal parts and comprise the respective bushing core, the respective outer sleeve and a substantially hollow cylindrical bellows in each case.

The bushing carriers have in each case an outer diameter, the greatest outer diameter corresponding to the greatest width of the bearing. Here, it is advantageous for the bearing to be no wider than the greatest outer diameter of a bushing carrier. In the transverse direction, the structure of the bearing is particularly compact as a result and is also suitable for being installed in tight installation spaces.

The ratio of the length of the bearing to its greatest width is preferably at least 2, more preferably 2.5 to 3.5.

As a result of the two rubber bushings being used in a functional parallel connection and therefore being able to jointly accommodate the load of the assembly that is to be supported, heavy loads can also be supported on the bearing having a compact structure, the bearing nevertheless having only a small width in comparison to the length. This is of great advantage when installing the bearing in tight installation conditions.

Figure 2:
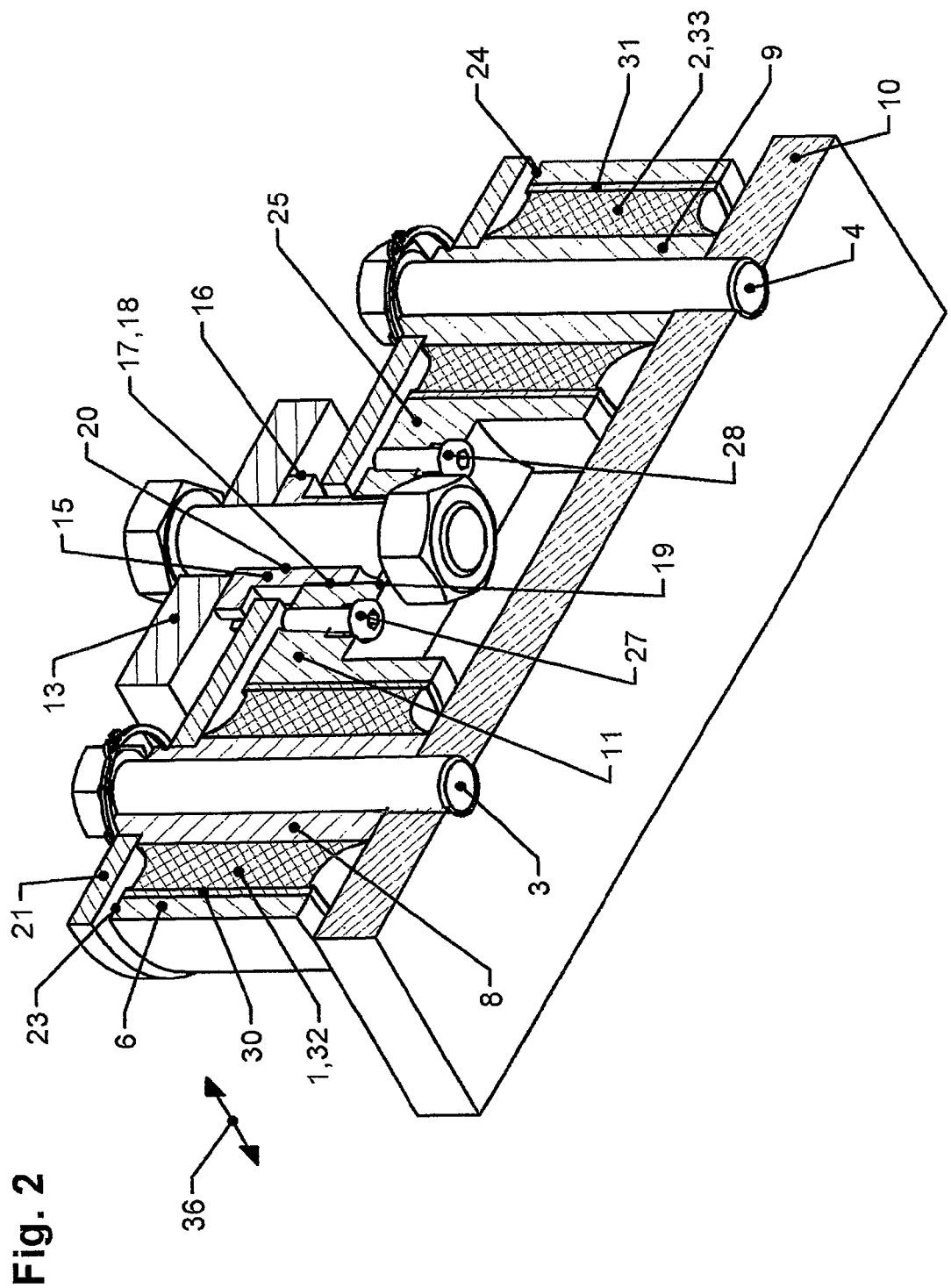
FIG. 2 shows the bearing from FIG. 1 in a perspective view diagonally from below.

A first embodiment of the bearing according to the invention is shown in FIGS. 1 and 2.

The bearing comprises two rubber bushings 1, 2 which are constructed rotationally symmetrically about a vertical axis of rotation 3, 4. The rubber bushings 1, 2 comprise the respective bushing core 8, 9, the respective outer sleeve 30, 31 and have in each case hollow cylindrical bellows 32, 33 made from an elastomer material. The bushing cores 8, 9 and the outer sleeves 30, 31 in this embodiment consist in each case of a metallic material.

Each rubber bushing 1, 2 is arranged in a bushing carrier 6, 7, the bushing carriers 6, 7 being arranged adjacently and at a distance 5 from one another in the longitudinal direction 29 of the bearing. The bushing carriers 6, 7 are interconnected by the bridge 11, the two bushing carriers 6, 7 and the bridge 11 in the embodiment shown here being formed in one piece in a manner transitioning into one another, and of the same material. The two rubber bushings 1, 2 and the two bushing carriers 6, 7 are each formed as carry-over parts. The bushing carriers 6, 7 and the bridge 11 consist of a metallic material.

The rubber bushings 1, 2 are arranged in a functional parallel connection and jointly support an assembly 13 that is to be supported and is only shown schematically here. The assembly 13 that is to be supported can, for example, be a marine diesel engine.

Also shown only schematically is the bracket 10, which is connected to the bushing cores 8, 9. The bracket 10 can, for example, be supported in a ship's hull. The bearing, the bracket 10 and the assembly 13 that is to be supported form a bearing arrangement.

The bridge 11 has an attachment device 12, which is connected to the assembly 13 that is to be supported. The attachment device 12 is formed primarily by a height-adjustable threaded sleeve 15 which is accommodated in the bridge 11, the threaded sleeve 15 being connected by means of an external thread 17 to the first internal thread 18 of the wall 19 delimiting the opening 14 and for its part has a second internal thread 20, to which the assembly 13 that is to be supported is screwed.

The external thread 17 of the threaded sleeve 15 and the internal thread 18 of the wall 19 are formed so as to be self-locking, and therefore the height of the threaded sleeve relative to the bridge 11 can be adjusted precisely in order to be able to optimally support the assembly 13 that is to be supported.

On its side facing the assembly 13 that is to be supported, the threaded sleeve 15 has an annular collar 16 which the assembly 13 that is to be supported contacts in an abutting manner.

In the embodiment shown here, the bracket 10 and the assembly 13 that is to be supported are screwed in each case to the bearing.

In order to prevent undesired high mechanical loads for the bellows 32, 33 during intended use of the bearing, the stop plate 21 is provided. Extreme deflection movements of the bushing cores 8, 9 relative to the bushing carriers 6, 7, the bridge 11, the threaded sleeve 15 and thus the assembly 13 that is to be supported are prevented. For this purpose, the stop plate 21 surrounds the threaded sleeve 15 on its periphery at a radial distance 22. Moreover, the surface of the stop plate 21 is associated with the surfaces 23, 24, 25 of the bushing carriers 6, 7 and bridge 11 adjacently and at the vertical distance 26.

Before undesired high mechanical loads act on the bellows 32, 33, the stop plate 21 limits the relative movements and therefore promotes consistently good performance characteristics of the bearing during a long service life.

The stop plate 21 is connected to the bushing cores 8, 9 so as to be immobile.

The two tension screws 27, 28 are arranged opposite one another in the longitudinal direction 29 of the bearing on either side of the opening 14. The installation of the bearing underneath an assembly that is to be supported is thus simplified; it is not necessary for the assembly 13 that is to be supported to be raised up in order to install the bearing.

The force is transmitted from the assembly 13 that is to be supported into the bearing via the threaded sleeve 15 into the bridge 11 and the bearing carriers 6, 7 and subsequently from there via the outer sleeves 30, 31 into the bellows 32, 33 and then into the bearing cores 8, 9, which are connected to the bracket 10. The vibrations introduced when the assembly 13 is being operated are isolated by the bellows 32, 33 of the rubber bushings 1, 2.

Figure 3:
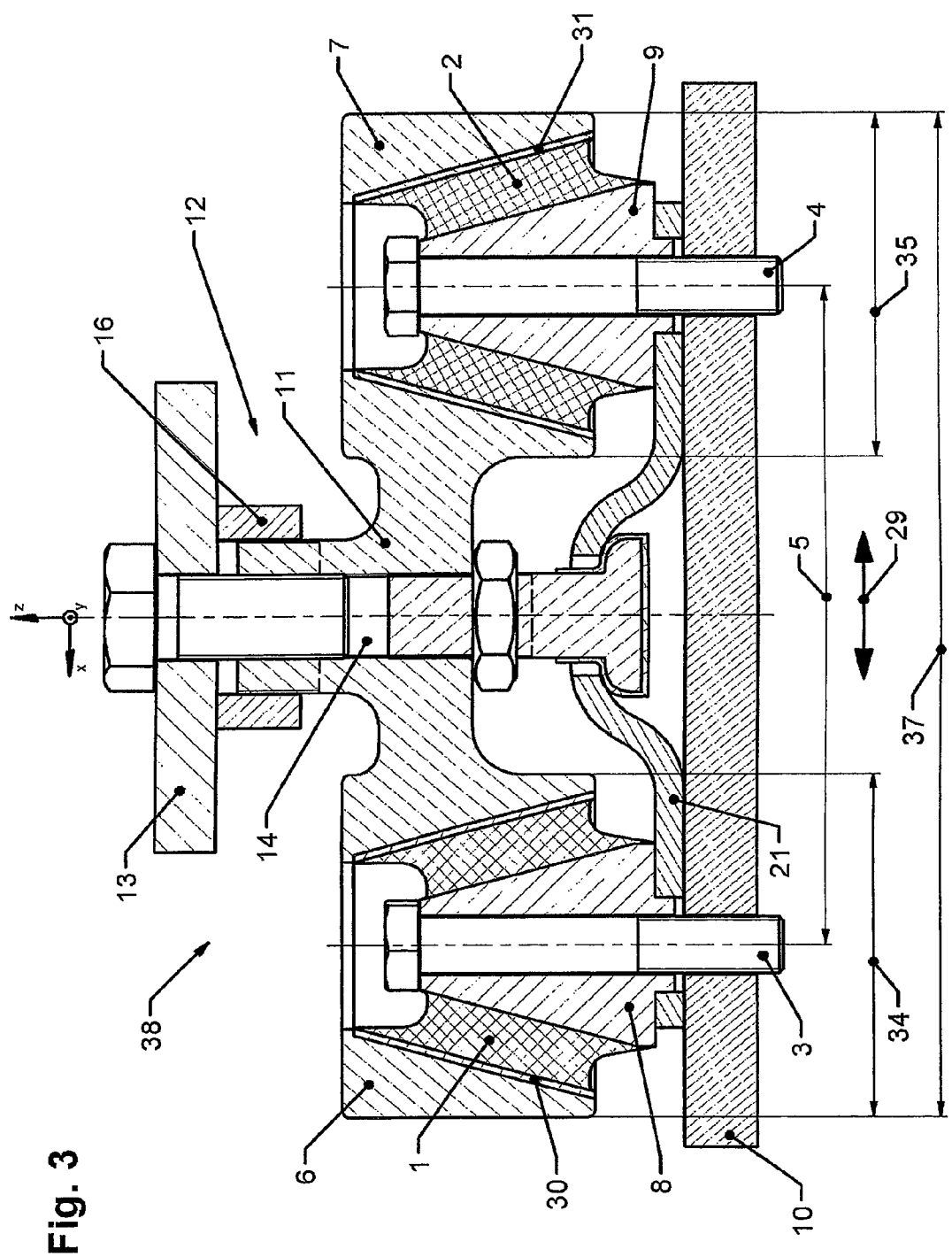
FIG. 3 shows a second embodiment of the bearing according to the invention.
Figure 4:
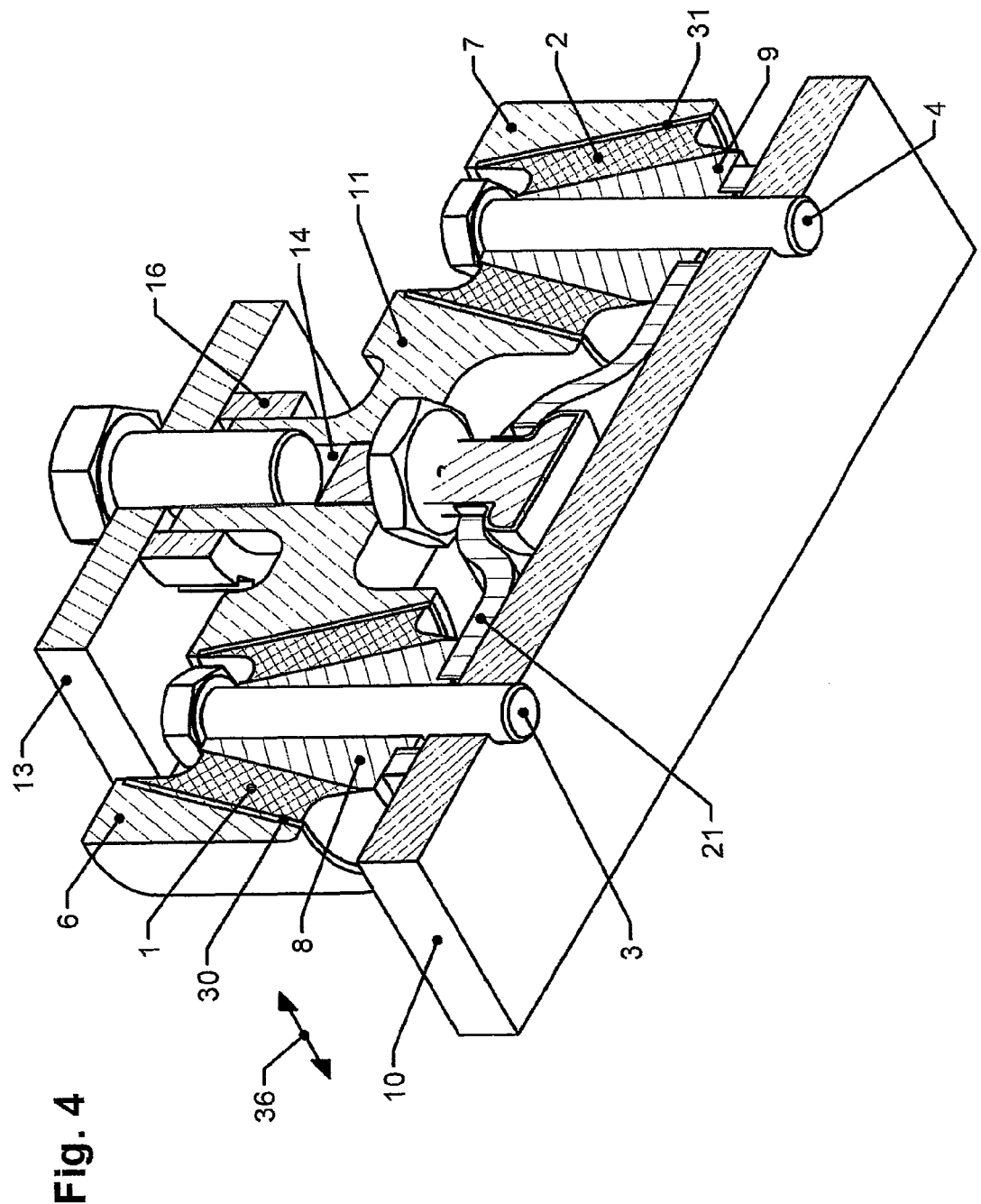
FIG. 4 shows the bearing from FIG. 3 in a perspective view diagonally from below.

A second embodiment of the bearing according to the invention is shown in FIGS. 3 and 4.

In this embodiment also, the bearing comprises two rubber bushings 1, 2 having in each case vertical axes of rotation 3, 4, the rubber bushings 1, 2 being arranged in a functional parallel connection. The two rubber bushings 1, 2 together with the bridge 11 form the unit 38 that can be pre-assembled.

In contrast to the embodiment in FIGS. 1 and 2, the rubber bushings 1, 2 in this embodiment are not substantially cylindrical but rather are conical.

A slotted nut for the height adjustment of the bearing is denoted by the reference numeral 16.

In this embodiment, the stop plate 21 is installed in the base of the bearing.

The ratio of the length 37 of the bearing to its greatest width 36 is approximately 3, just as in the embodiment from FIGS. 1 and 2.

As a result of a conical shape of the rubber tracks of the rubber bushings 1 and 2, a greater vertical rigidity can be set and thus even greater vertical loads can be accommodated. Depending on the form of the cone angle, a vertical/longitudinal rigidity ratio can be set. In the embodiment, the stop plate 21 is displaced downwards. This forms an alternative possibility for how the vertical limitation of travel can be implemented.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A bearing, comprising:
a first rubber bushing; and
a second rubber bushing,
wherein each rubber bushing includes a vertical axis of rotation,
wherein the rubber bushings are functionally connected in parallel,
wherein the first and second rubber bushings are arranged adjacently, at a distance from one another, each in a bushing carrier, wherein the first and second rubber bushings each include a substantially hollow, cylindrical-shaped bushing core, each bushing core being connectable to a bracket, wherein the bushing carriers are interconnected by a bridge including an attachment device configured to attach an assembly to be supported, wherein the attachment device includes an opening in the bridge, wherein the opening includes a threaded sleeve, arranged in the opening, wherein the threaded sleeve includes, at a front end on one side, an annular collar for the assembly to be supported, and wherein the threaded sleeve, at the front end on another side, is height-adjustably connected, using an external thread, to a first internal thread of a wall of the bridge delimiting the opening, and wherein the threaded sleeve includes a second internal thread configured to attach the assembly to be supported on the annular collar.

2. The bearing of claim 1, wherein the first and second rubber bushings form a unit that can be pre-assembled.

3. The bearing of claim 1, wherein the bushing cores of the first and second rubber bushings are connected to a stop plate on a side of the bushing carriers and on a side of the bridge facing the collar, so as to be immobile, wherein the stop plate surrounds the threaded sleeve on its periphery at a radial distance, and wherein the stop plate is associated with adjacent surfaces of the bushing carriers and the bridge adjacently and at a vertical distance during intended use of the bearing.

4. The bearing of claim 1, further comprising:
a tension screw, arranged in the bridge, configured to mutually pretension the bridge and the bushing carriers with respect to a stop plate.

5. The bearing of claim 4, further comprising:
a first tension screw; and
a second tension screw,
wherein the first and second tension screws are arranged opposite one another in a longitudinal direction of the bearing on either side of the opening.

6. The bearing of claim 1, the bushing carriers and the bridge are formed in one piece in a manner transitioning into one another and of the same material.

7. The bearing of claim 1, wherein the first and second rubber bushings each include a threaded sleeve on their outer circumference, and
wherein the external sleeves are arranged in a force-fitting manner in respective bushing carriers.

8. The bearing of claim 1, wherein the first and second rubber bushings are each constructed as rubber-metal parts, and
wherein the first and second rubber bushings each include a respective bushing core, a respective outer sleeve, and a substantially hollow, cylindrical-shaped bellows.

9. The bearing of claim 1, wherein the bushing carriers each have an external diameter, and
wherein the greatest external diameter corresponds to the greatest width of the bearing.

10. The bearing of claim 1, wherein a ratio of a length of the bearing to its greatest width is at least 2.

11. The bearing of claim 1, comprising more than two rubber bushings.

12. A bearing, comprising:
a first rubber bushing;
a second rubber bushing; and
a tension screw,
wherein each rubber bushing includes a vertical axis of rotation, and
wherein the rubber bushings are functionally connected in parallel,
wherein the first and second rubber bushings are arranged adjacently, at a distance from one another, each in a bushing carrier,
wherein the first and second rubber bushings each include a substantially hollow, cylindrical-shaped bushing core, each bushing core being connectable to a bracket,
wherein the bushing carriers are interconnected by a bridge including an attachment device configured to attach an assembly to be supported, and
wherein a tension screw, arranged in the bridge, configured to mutually pretension the bridge and the bushing carriers with respect to the stop plate.

13. The bearing of claim 12, comprising more than two rubber bushings.

14. The bearing of claim 12, wherein the bushing carriers each have an external diameter, and
wherein the greatest external diameter corresponds to the greatest width of the bearing.

15. The bearing of claim 12, wherein a ratio of a length of the bearing to its greatest width is at least 2.

16. The bearing of claim 12, wherein the bushing cores of the first and second rubber bushings are connected to a stop plate on a side of the bushing carriers and on a side of the bridge facing the collar, so as to be immobile,
wherein the stop plate surrounds the threaded sleeve on its periphery at a radial distance, and
wherein the stop plate is associated with adjacent surfaces of the bushing carriers and the bridge adjacently and at a vertical distance during intended use of the bearing.

17. The bearing of claim 12, further comprising:
a tension screw, arranged in the bridge, configured to mutually pretension the bridge and the bushing carriers with respect to the stop plate.

18. A bearing, comprising:
a first rubber bushing; and
a second rubber bushing,
wherein each rubber bushing includes a vertical axis of rotation,
wherein the rubber bushings are functionally connected in parallel,
wherein the first and second rubber bushings each include a threaded sleeve on their outer circumference, and
wherein the external sleeves are arranged in a force-fitting manner in respective bushing carriers.

19. The bearing of claim 1, wherein the first and second rubber bushings form a unit that can be pre-assembled.

20. The bearing of claim 1, wherein the bushing carriers each have an external diameter, and
wherein the greatest external diameter corresponds to the greatest width of the bearing.

* * * * *